G. K. BROWN.
Corn Husker.
No. 18,433.
2 Sheets—Sheet 1.
Patented Oct. 20, 1857.
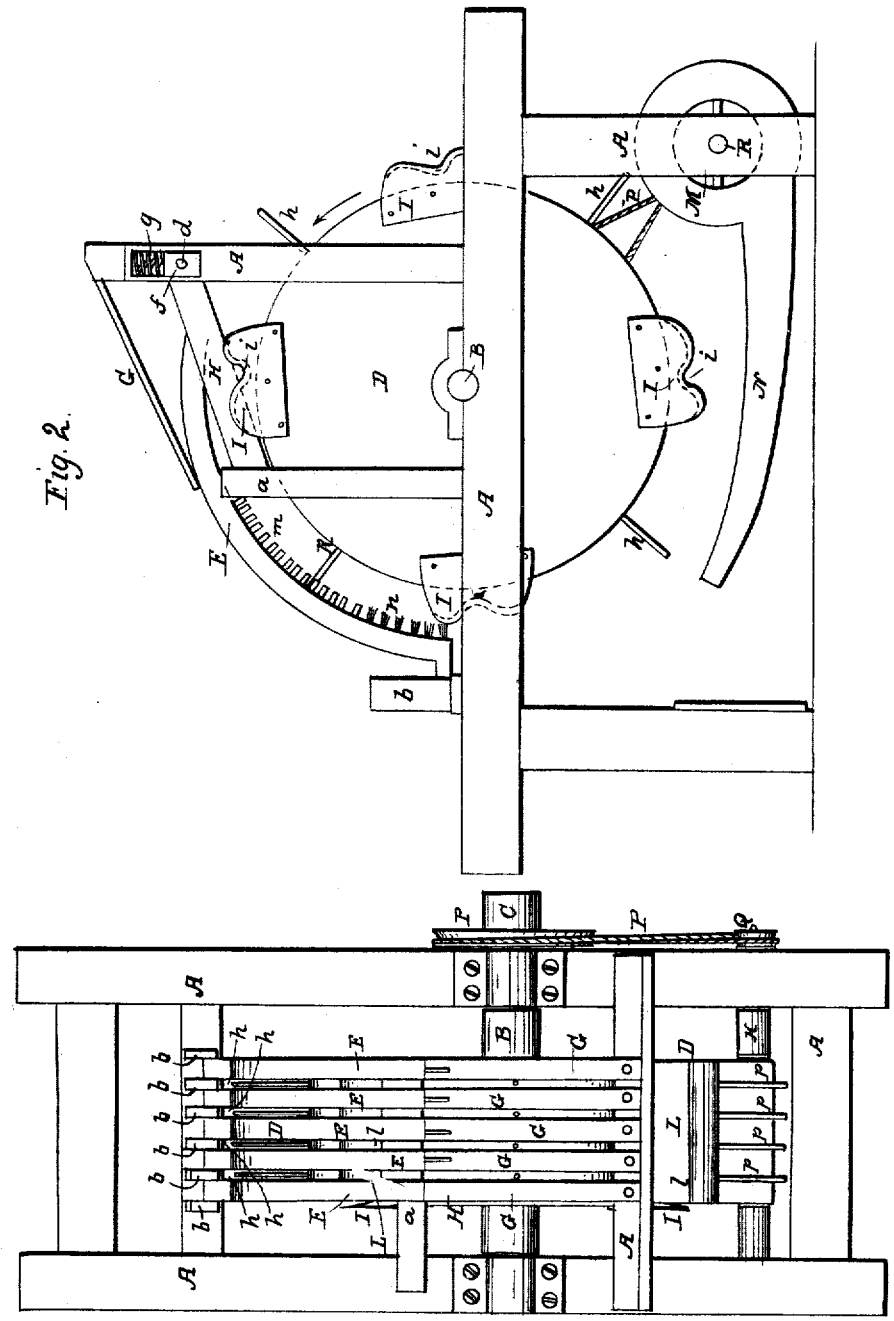

G. '. BROWN.
orn Husker.
2 Sheets—Sheet 2.
No. 18,433.
Patented Oct. 20, 1857.
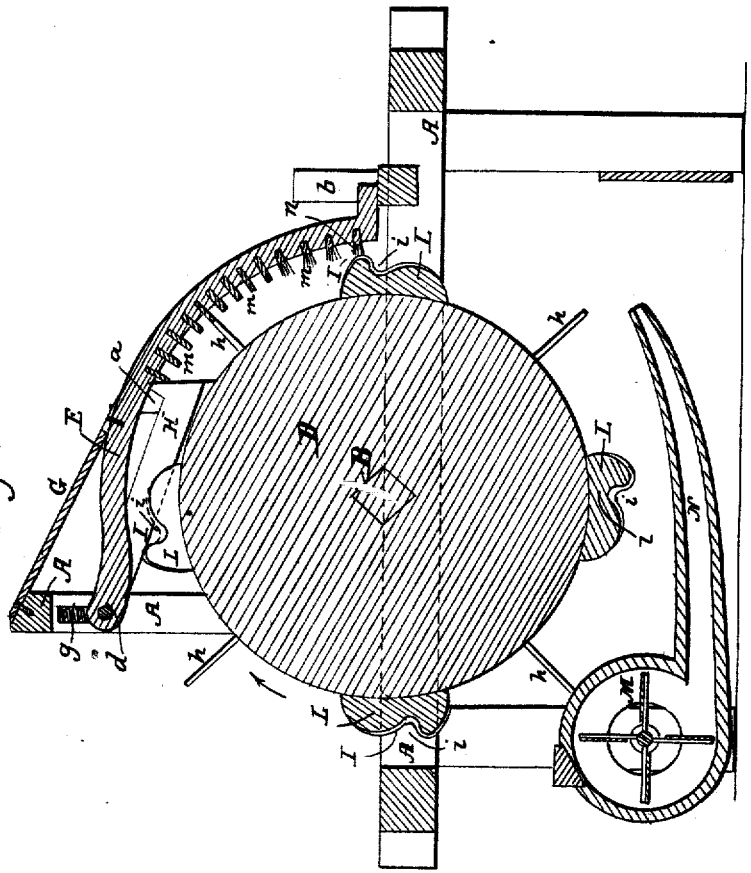
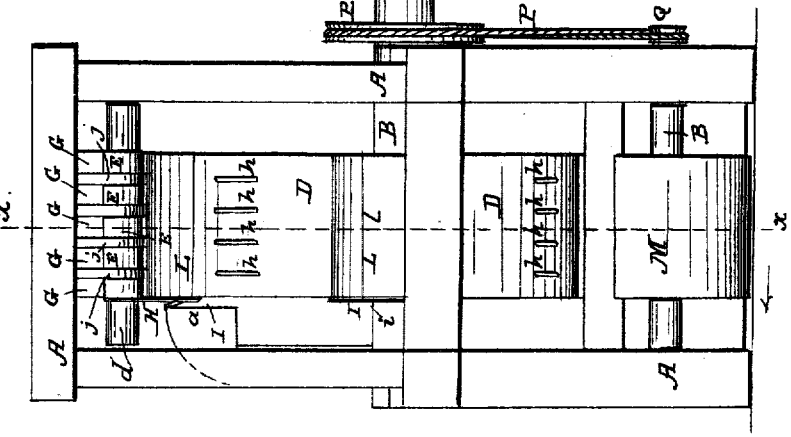

UNITED STATES PATENT OFFICE.

GEORGE K. BROWN, OF MOULTONBORO, NEW HAMPSHIRE.

CORN-HUSKER.

Specification of Letters Patent No. 18,433, dated October 20, 1857.

*To all whom it may concern:*

Be it known that I, GEORGE K. BROWN, of Moultonboro, in the county of Carroll and State of New Hampshire, have invented a new and Improved Machine for Husking Corn; and I do hereby declare that the following is a full and exact description thereof, reference being had to the accompanying drawings, making part of this specification, Figure 1 being a plan of the machine; Fig. 2, a side elevation thereof; Fig. 3, a front elevation of the same; Fig. 4, a longitudinal vertical section in the plane indicated by the line *x x*, Fig. 3.

Like letters designate corresponding parts in all the figures.

I employ a drum, or wheel, D, of convenient diameter, and of a thickness sufficient to receive the full length of any ear of corn to be husked. This drum is secured to a driving shaft B, which is mounted in a suitable frame A, and driven by a winch, or by power communicated to a pulley C, on one end thereof. The drum, thus caused to turn at a suitable rate of speed, serves to receive the ears of corn, to convey them through the machine, and hold them to be subjected to the required operation of husking, as hereinafter set forth.

At suitable distances apart, holding sockets L, L, are formed in, or secured on, the periphery of the drum, substantially of the form and arrangement shown in the drawings. The hollows *l, l,* thereof, in which the ears of corn are placed, have low sloping sides, or scarcely any in front; but, behind, the sides are higher and more abrupt, substantially as shown in Fig. 4; or such that the ears of corn will be allowed to turn in the hollows, in the act of having their husks stripped off, and not be allowed to pass over said rear sides or backs; and at the same time, so that said backs shall not come in contact with the stripping teeth presently to be described. Hence, said backs should be low enough to allow the stripping teeth to remove all the husks from the smallest ears of corn; and high enough to hold the largest ears of corn. The sockets may project somewhat from the periphery of the drum, as represented.

At one end of each socket L, is secured a gage plate I, to the face of the drum, substantially as shown; or the several plates may compose a single rim occupying the entire circle. The projecting edges of these gage plates correspond somewhat in shape with the profiles of the sockets; but project considerably farther than the said sockets, or at least in the hollow portions *i, i,* corresponding with, or opposite to, the hollows *l, l,* of the sockets. In the said hollows of the gage plates, rest the stems of the ears of corn; and against their projecting sides, the butts of the ears are placed, when placing the ears in the sockets; and thus the ears are all properly gaged in position for being subjected to the knife which cuts off the stems, and ends of the husks. They may be adjustable to different distances from the ends of the sockets.

The knife H, which cuts off the stems, and ends of the husks, is secured, at the rear end, to a standard *a*, or its equivalent, projecting from the frame A; and the front end is secured on a pin, or rod, *d*, the bearings of which rest in sliding blocks *f, f,* held down by springs *g, g*. Thus the front end of the knife is allowed to yield when necessary. Its situation is such that the motion of the ears beneath it will produce a "drawing" or wedging cut upon the stems thereof, as indicated in Figs. 2, and 4. The edge of the knife is situated between the gage plates I, I, and the ends of the sockets L, L; and may be in close proximity to, or contact with, said gage plates; and by making the edges of the gage plates sharp, they will serve to assist in cutting off the stems, they and the knife acting together like shears. Instead of giving sharp edges to the gage plates, they may have sharp teeth, or serrated edges, so as not only to assist in cutting the stems of the ears, but also more surely to seize, and hold the ears in place.

Above the drum, and at a suitable distance therefrom, is situated a set of curved ribs E, E, arranged substantially as represented in the drawings. Their front or upper ends are mounted on the yielding rod *d*, above described, or its equivalent, so that they can yield, or be raised somewhat when necessary. When guides *j, j,* projecting downward from the frame A, are employed to keep the ribs E, E, in their proper places, they should be provided with slots in which the rod *d*, may move as much as required. The lower ends of the ribs rest upon a bar of the frame, and are kept in proper position by guide pins *b, b,* as shown; so that the ribs have narrow spaces between one another. They are held down with a proper degree of force, by springs G, G, which are arranged substantially as represented. In the under, concave sides of these ribs, commencing just behind the cutting knife I, and extending some distance back, are inserted short teeth $m$, $m$, substantially as shown in Figs. 2 and 4. These teeth take hold of the husks as the ears of corn are brought beneath the ribs; and the ends of the husks having been cut off by the knife I, they are readily stripped from the ears of corn, by these stripping teeth. The elasticity of the ribs enables them to adapt themselves to any size of ears of corn. Below the teeth are inserted in the ribs, brushes $n$, $n$, which serve to brush off any remaining husks which may cling between the rows of grain, and also to remove the "silks" therefrom.

Between the holding sockets L, L, slender teeth or pins $h$, $h$, are inserted into the periphery of the drum D, so that they will pass through the spaces between the ribs G, G. These teeth serve to clear away all husks which may gather between the teeth $m$, $m$, and brushes $n$, $n$, as fast as they collect. All the husks and impurities may be removed from the machine by means of a blast of air created by a revolving fan M, and directed beneath the falling husks by a spout N. The motion may be communicated to the fan, by a band $p$, passing from a pulley P, on the driving shaft B, to a pulley Q, on the axis R, of said fan.

I do not claim hollows or sockets, for holding the ears of corn, for the purpose of being conveyed into the machine; nor do I claim a stationary knife in connection with a feeding drum for cutting off the stems and husks; but

What I claim as my invention and desire to secure by Letters Patent, is—

The rotating drum D, provided with holding rackets L, gage plates I, and clearing teeth $h$, and acting in combination with the stationary cutting knife H, and elastic ribs E, provided with stripping teeth $m$, with or without brushes $n$, on their under sides, in the manner and for the purposes specified.

In witness that the above is a true specification of my improved machine for husking corn, I hereunto set by hand this twenty-ninth day of May, 1857.

GEORGE K. BROWN.

Witnesses:
S. F. DAVIS,
IRA F. FOLSOM.